June 23, 1936. P. W. FASSLER 2,045,523
ONE-FACE RESISTANCE WELDING MACHINE
Filed April 15, 1935 3 Sheets-Sheet 1

INVENTOR.
Peter W. Fassler
BY Everett G. Wright
ATTORNEY.

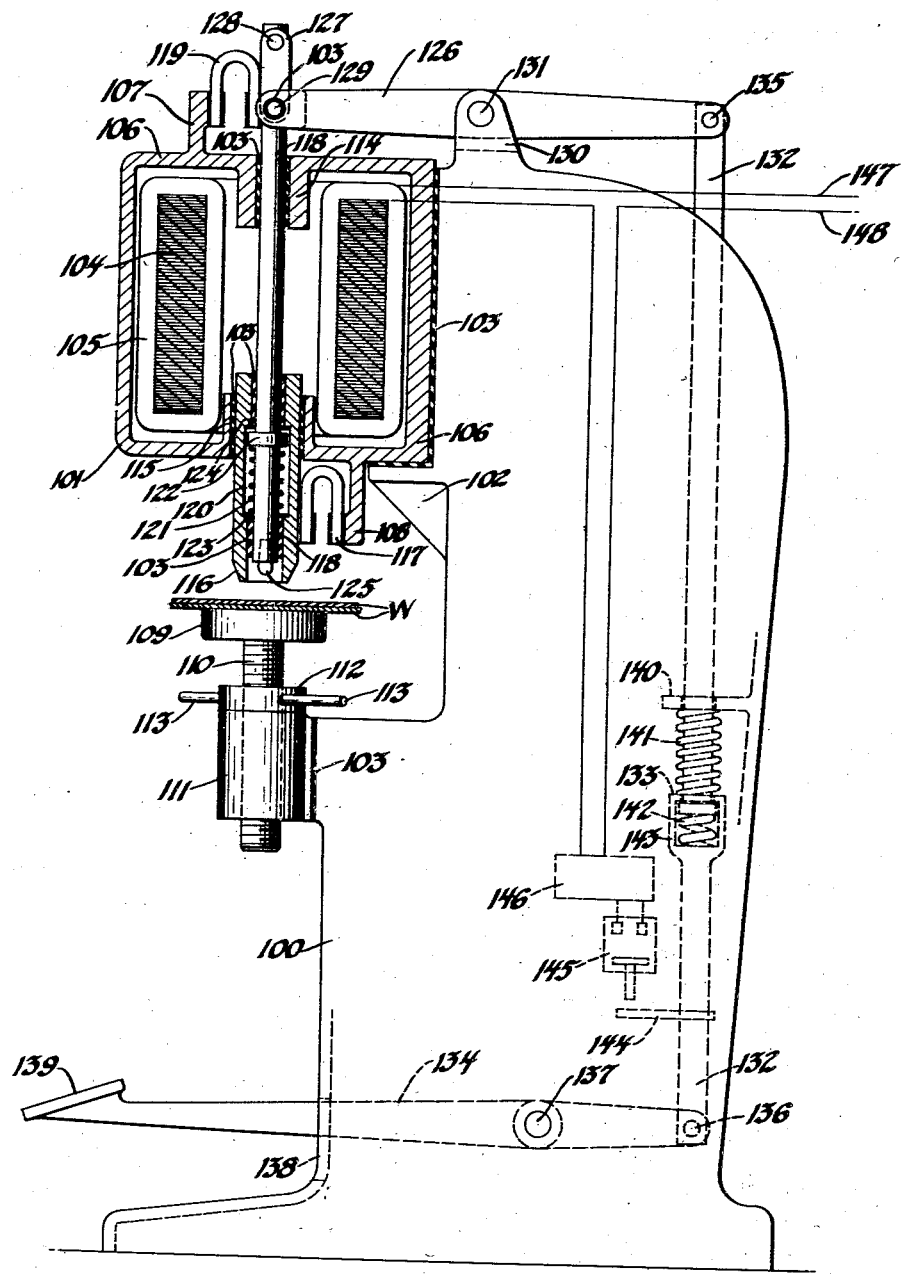

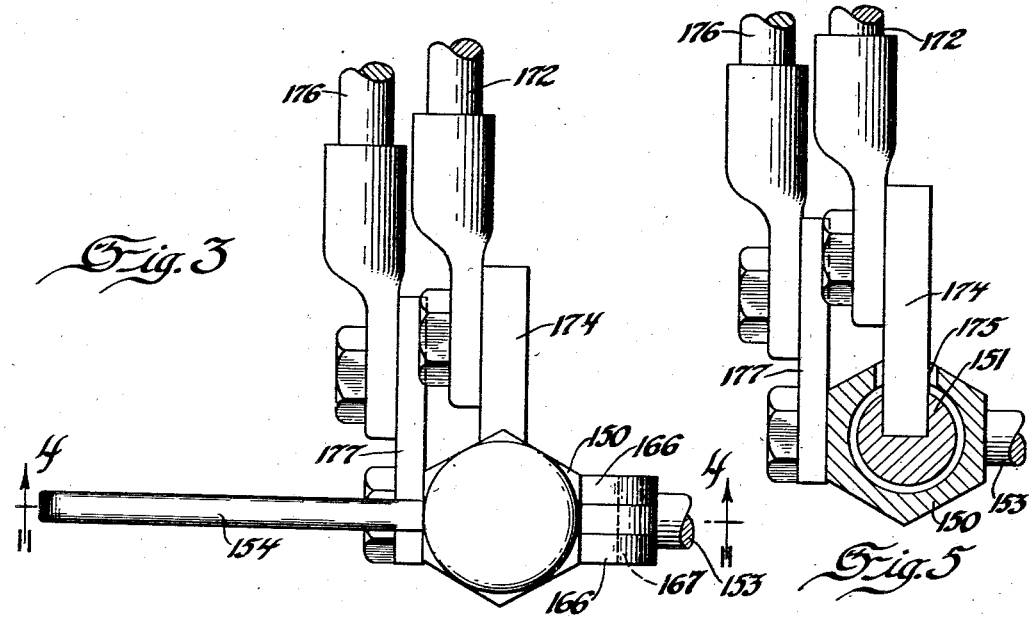
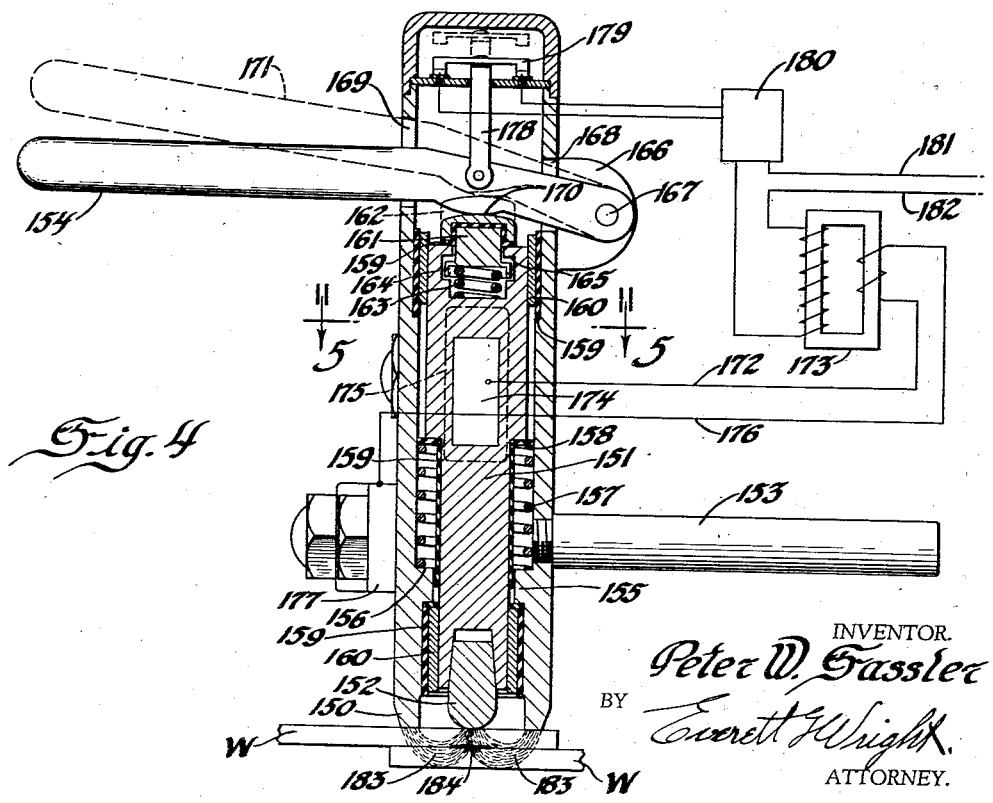

Patented June 23, 1936

2,045,523

UNITED STATES PATENT OFFICE 2,045,523

ONE-FACE RESISTANCE WELDING MACHINE

Peter W. Fassler, Detroit, Mich.

Application April 15, 1935, Serial No. 16,320

5 Claims. (Cl. 219—4)

This invention relates to welding machines and in particular to resistance welding machines which operate on one face of the work welded thereby.

In the conventional spot or seam welding machines which are mostly built to perform a plurality of welds with the electrodes thereof in electrical parallel relationship, the work is laid between the electrodes and welded under pressure. In the conventional resistance series welding machine, two or more electrodes are applied to one side of the work to be welded therein in electrical series relationship and a contact bridge of high electric conductivity is applied to the other side of the work as a current carrier, the said bridge exerting pressure on the work during welding. In the present invention, both electrodes are applied to one side of the work with sufficient pressure to permit the welding current to pass through the work to be welded together without arcing therebetween, the said electrodes being in such a relation to each other as to effectively perform a single resistance spot weld.

One object of this invention is to provide a one face resistance welding machine.

Another object of this invention is to provide a resistance spot welding machine in which one electrode is circumscribed by the other and both electrodes are applied with pressure to one side of the work to be welded thereby.

Another object of this invention is to provide a machine for performing a resistance weld entirely from one side of the work to be welded, said resistance weld being in the nature of a spot weld accomplished under pressure by electrodes in electrical series relationship, one of said electrodes being preferably circumscribed or surrounded by the other.

Another object of this invention is to provide a machine for making a one face resistance spot weld in which both electrodes thereof are applied under pressure to one face of work to be welded using where necessary and when required a support or the like to back up said work.

Another object of this invention is to provide a one face resistance spot welding machine for welding box shaped structures and the like, the said machine and electrodes being so arranged as to encompass a minimum amount of work and space, thereby reducing the reactance of the entire welding circuit of the said machine.

Another object of this invention is to provide a resistance spot welding machine in which one electrode is reciprocally mounted within the other and both electrodes are adapted to be applied with pressure to one side of work to be welded, the said electrodes being so mounted to cause only a minimum reactance to the entire welding circuit of the said machine.

Another object of this invention is to provide a resistance spot welding machine in which one electrode is circumscribed or surrounded by the other and both electrodes adapted to be applied under pressure to one side of the work being welded thereby, and in which both electrodes are slidably mounted through a transformer, the said relation of electrodes, transformer and work being welded causing a minimum reactance in the entire secondary circuit of the said welding machine.

Other objects of this invention will become apparent by reference to the following detailed description taken in connection with the following drawings, in which:

Fig. 2 is a view part in section and part in elevation illustrating another embodiment of the invention.

Fig. 3 is a part top view illustrating a portable welding machine embodying the invention.

Fig. 4 is a view part in section and part in elevation taken substantially on the line 4—4 of Fig. 3.

Fig. 5 is a section taken on the line 5—5 of Fig. 4 looking in the direction indicated by the arrows.

Figure 1:
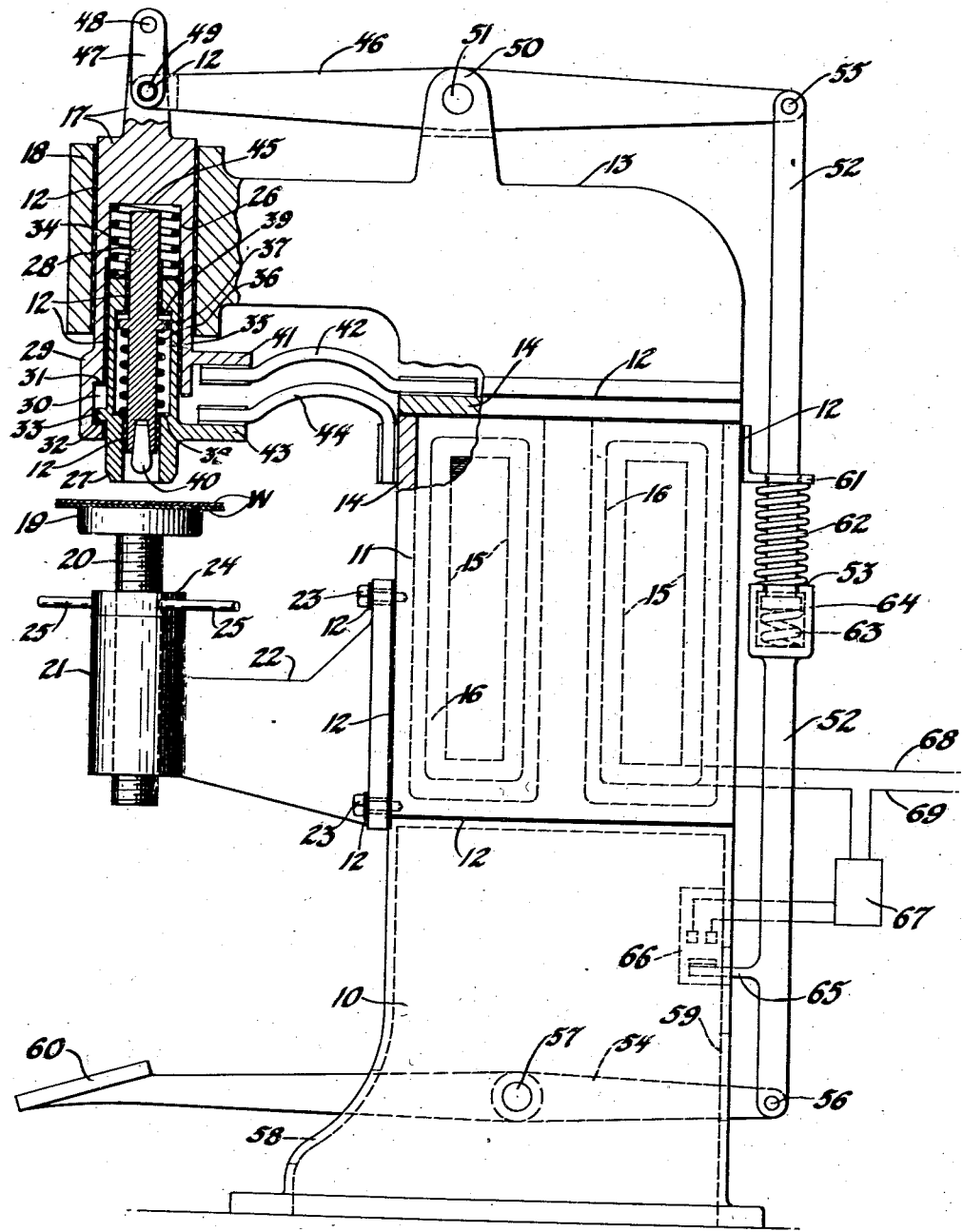
Fig. 1 is a view part in section and part in elevation showing a welding machine embodying the invention.

Referring now to the drawings and particularly to the embodiment shown in Fig. 1, the welding machine comprises in general a base 10 having a transformer 11 secured thereon but insulated therefrom by any suitable insulation generally designated by the numeral 12. An operating head 13 is cantilevered forward from the top of the said transformer 11 but insulated therefrom by insulation 12.

The transformer 11 illustrated herein having been disclosed and claimed in my patent for Welding transformers, Patent No. 1,986,884, is not a part of this invention, however, its use is preferable to transformers of the usual type and is highly desirable when a transformer having a multiple turn secondary winding is required or becomes advantageous. The transformer 11 consists in general of a combined housing and secondary winding 14, and a core 15 and primary winding 16 within the said housing.

A preferably cylindrical electrode carrier 17 is slidably mounted within a vertically disposed annular sleeve 18 at the outer end of the operating head 13 but insulated therefrom by any suitable insulation 12. An adjustable work support 19 is located directly below the annular sleeve 18 in vertically spaced relation thereto. The work support 19 is secured to the upper end of a screw 20 which is turnable within a threaded sleeve 21 at the outer end of a bracket 22 secured to the transformer 11 by insulated bolts 23 and insulated therefrom by any suitable insulation 12. The work support 19 may be maintained in any desired vertical adjustment by turning a lock nut 24 on the screw 20 against the upper face of the threaded sleeve 21 by means of radially disposed hand grips 25.

The cylindrical electrode carrier 17 is provided with an axially disposed annular bore 26 extending from the bottom thereof upward to a point sufficiently high to accommodate a tubular electrode 27 having a solid electrode holder 28 slidably mounted therein with a space left between the upper end of the solid electrode holder 28 and the upper end of the bore 26. One side of the said electrode carrier 17 is provided with an arcuate radially extending collar 29 which depends below the normal bottom of the said electrode carrier 17. The said depending collar 29 is provided with an inwardly disposed notch 30 forming upper and lower shoulders 31 and 32 which cooperate with a radially extending lug 33 on the tubular electrode 27 to move and limit the movement of the said tubular electrode as hereinafter described.

A spring 34 at the upper end of the annular bore 26 of the electrode carrier 17 urges the tubular electrode 27 downward to its normal position with its lug 33 against the lower shoulder 32 of the depending collar 29.

The tubular electrode 27 has a spring chamber 35 formed therein to accommodate a spring 36 which normally urges the solid electrode holder 28 to its normal upward position as shown in the drawings by acting against a radially extending annular lug 37 on the electrode holder 28 and the lower shoulder 38 formed by the spring chamber 35. The said lug 37 bearing against the upper shoulder 39 formed by the spring chamber 35 limits the upward movement of the solid electrode holder 28 in relation to the tubular electrode 27. A centrally disposed electrode 40 may be wedged or otherwise secured in the lower end of the solid electrode holder 28.

The cylindrical electrode carrier 17 is provided with a lug 41 to which a flexible lead 42 supplies welding current from one secondary transformer terminal, and the tubular electrode 27 is provided with a similar lug 43 to which a flexible lead 44 supplies welding current from the other secondary transformer terminal.

It will be noted that the cylindrical electrode carrier 17, the tubular electrode 27 and the solid electrode holder 28 are each insulated from each other by any suitable insulation generally designated by the numeral 12, however, the top of the solid electrode holder 28 is uninsulated inasmuch as it receives welding current through contact with the cylindrical electrode carrier 17 at the top of the annular bore 26 which is designated by numeral 45 in Fig. 1 of the drawings.

The cylindrical electrode carrier 17 is held in its normal upward position by suspension from a bifurcated end of an overhead lever 46 by means of two links 47 connected to the said electrode carrier with a pin 48 and journaled to the overhead lever 46 by the pins 49 bushed with any suitable insulation 12.

The said overhead lever 46 may be hingedly supported from the operating head 13 by means of a U-shaped bracket 50 and the hinge pin 51. A vertical jointed linkage member 52 having a spring seat 53 formed thereon is hingedly connected to the rear of the overhead lever 46 and to the rear of a lower lever 54 by pins 55 and 56 respectively. The said lower lever 54 is mounted on a shaft 57 journaled in the base 10 of the machine and extends through slots 58 and 59 in the front and rear of the base 10 respectively. A suitable pedal 60 is provided on the forward end of the lower lever 54.

An angle 61 is secured to the rear of the transformer 11 but insulated therefrom and situated in such a relation to the spring seat 53 on the linkage member 52 that a suitable spring 62 around the linkage member 52 between the angle 61 and the spring seat 53 will constantly urge the said linkage member downward to a normal position holding the rearward portion of the lower lever 54 to its lower limit against the rear wall of the base 10 at the bottom of the slot 59, in which position through the system of linkage hereinbefore described, the cylindrical electrode carrier 17 and the operating pedal 60 are maintained in a normal position ready for operation.

In operating the embodiment of this invention shown in Fig. 1, the work support 19 is adjusted to the required level and the work W is placed thereon positioned under the electrode 40 for welding. The operator depresses the foot pedal 60 which first causes the cylindrical electrode carrier 17 to slide downwardly carrying the tubular electrode 27 into contact with the work W; additional downward movement of the electrode carrier 17 then causes the tubular electrode 27 to telescope within the cylindrical electrode carrier 17 and compress the spring 34 until the top of the solid electrode holder 28 contacts the top of the bore 26 at 45, at which time, the solid electrode holder 28 is carried downwardly with the cylindrical electrode carrier 17, the said electrode holder 28 and the said cylindrical electrode carrier 17 both moving in inner and outer telescopic relationship respectively to the tubular electrode 27.

The last mentioned movement compresses the spring 36 until the centrally disposed electrode 40 contacts the work W. Additional downward pressure on the foot pedal 60 then causes the spring 63 of the sliding joint 64 of the jointed linkage member 52 to compress thereby permitting the lower portion of the jointed linkage member 52 to move upward until sufficient welding pressure has been applied to the work W by both electrodes 27 and 40, at which time, the contact arm 65 on the linkage member 52 closes the circuit in the contactor 66 which actuates the adjustable time limit relay 67 causing a flow of alternating current into the transformer primary 16 from a source of alternating current supply designated by the numerals 68 and 69 in the drawings. The adjustable time limit relay 67 operating in conjunction with the contactor 66 may be used to regulate the welding time in accordance with the thickness of the work W.

In the embodiment shown in Fig. 2, the welding machine comprises in general a combined base and upright 100 having a transformer 101 supported on a bracket 102 and secured to the forward portion of the said upright by any desirable means but insulated therefrom by any suitable insulation generally designated by the numeral 103.

The transformer 101 illustrated in Fig. 2 is preferably of the type disclosed and claimed in my patent for Welding transformers, Patent No. 1,986,884, however, it is not a part of this invention except as it may be used in combination with the electrodes as herein disclosed and described. It is highly desirable when a transformer having a multiple turn secondary winding is required or becomes advantageous.

The particular transformer shown in the drawings comprises a core 104 and a primary winding 105, both of which are housed in a combined housing and secondary winding 106. Lugs 107 and 108 on the secondary winding serve as the secondary terminals of the transformer.

An adjustable work support 109 is centered under the center of the transformer and located in vertically spaced relation thereto. The work support 109 is secured to the upper end of a screw 110 which is turnable within a threaded sleeve 111 fastened by suitable means to the base 100 but insulated therefrom by any suitable insulation 103. The work support 109 may be maintained in any desired vertical adjustment by turning a lock nut 112 against the upper face of the threaded sleeve 111 by means of radially disposed hand grips 113.

The transformer housing 106 is formed to provide upper and lower central inwardly disposed annular sleeves 114 and 115 respectively. A vertically disposed tubular electrode 116 is slidably mounted through the lower annular sleeve 115 and is connected to the transformer terminal 108 by the flexible lead 117. A solid electrode holder 118 is slidably mounted through the upper annular sleeve 114 and extends downward through the center of the transformer 101 to and within the tubular electrode 116 in telescopic relation thereto. A flexible lead 119 connects the solid electrode holder 118 to the transformer terminal 107.

The tubular electrode 116 has a spring chamber 120 formed therein to accommodate a spring 121 which normally urges the said tubular electrode 116 to the normal position shown in the drawings by acting against a radially extending annular lug 122 on the solid electrode holder 118 and a lower shoulder 123 formed by the spring chamber 120. The said lug 122 bearing against an upper shoulder 124 formed by the spring chamber 120 limits the downward movement of the tubular electrode 116 in relation to the solid electrode holder 118. A centrally disposed electrode 125 may be wedged or otherwise secured in the lower end of the solid electrode holder 118.

It will be noted that the tubular electrode 116 is insulated from the solid electrode holder 118 and that both the tubular electrode 116 and the solid electrode holder 118 are insulated from the annular sleeves 115 and 114 respectively of the combined housing and secondary winding 106 of the transformer 101 by any suitable insulation generally designated by the numeral 103.

The solid electrode holder 118 which carries the tubular electrode 116 is held in its normal upward position by suspension from the bifurcated forward end of an overhead lever 126 by means of two links 127 connected to the said electrode holder 118 with a pin 128 and journaled to the overhead lever 126 by the pins 129 bushed with any suitable insulation 103.

The said overhead lever 126 may be hingedly supported from the top of the combined base and upright 100 by means of a U-shaped bracket 130 and the hinge pin 131. A vertical jointed linkage member 132 having a spring seat 133 formed thereon is hingedly connected to the rear of the overhead lever 126 and to the rear of the lower lever 134 by pins 135 and 136 respectively. The said lower lever 134 is mounted on a shaft 137 journaled in the base 100 of the welding machine and extends through the slot 138 in the front of the said base 100. A suitable foot pedal 139 is provided at the forward end of the lower lever 134.

A bracket 140 is suitably located in relation to the spring seat 133 on the linkage member 132 to permit a spring 141 around the linkage member 132 between the bracket 140 and the spring seat 133 to constantly urge the said linkage member 132 downward to a normal position holding the forward portion of the lower lever 134 to its upward limit against the front wall of the base 100 at the top of the slot 138, in which position through the system of linkage hereinbefore described, the solid electrode holder 118 and the operating foot pedal 139 are maintained in a normal position ready for operation.

In operating the embodiment of this invention shown in Fig. 2, the work support 109 is adjusted to the required level and the work W is placed thereon positioned under the electrode 125 for welding. The operator depresses the foot pedal 139 which first causes the solid electrode holder 118 to slide downwardly carrying the tubular electrode 116 into contact with the work W; additional downward movement of the solid electrode holder 118 then causes it to telescope within the tubular electrode 116 and compress the spring 121 until the centrally disposed electrode 125 contacts the work W.

Additional downward pressure on the foot pedal 139 then causes the spring 142 of the sliding joint 143 to compress thereby permitting the lower portion of the jointed linkage member 132 to move upward until sufficient welding pressure has been applied to the work W by both electrodes 116 and 125, at which time the contact arm 144 on the linkage member 132 closes the circuit in the contactor 145 which actuates an adjustable time limit relay 146 causing a flow of alternating current into the transformer primary 105 from a source of alternating current supply designated by the numerals 147 and 148 in the drawings. The adjustable time limit relay 146 operating in conjunction with the contactor 145 may be used to regulate the welding time in accordance with the thickness of the work W.

Figs. 3, 4 and 5 illustrate a portable welding machine embodying this invention which comprises a combined tubular electrode and hexagonal housing 150 having a solid electrode holder 151 slidably mounted therein. A centrally disposed electrode 152 may be wedged or otherwise secured in the lower end of the solid electrode holder 151.

Fig. 4 shows both the tubular electrode 150 and the centrally disposed electrode 152 in operating contact with the work W in which position the electrodes are maintained under welding pressure by its operator urging the machine against the work W by means of a hand grip 153 and an operating lever 154.

The tubular electrode 150 having the radially disposed hand grip 153 mounted on one side thereof is bored to provide an inwardly disposed annular lug 155 forming a shoulder 156 against which a spring 157 within the said tubular electrode 150 acts and normally urges the solid electrode holder 151 upward by exerting pressure against an annular shoulder 158 of the solid electrode holder 151 formed by reducing the diameter of the lower portion thereof. The portions of the solid electrode holder 151 that are not held in spaced relation to the tubular electrode 150 are insulated therefrom by any suitable insulation 159. The said insulation may be moulded to bushings 160 if desired to provide a wearing surface between the insulation 159 and the solid electrode holder 151.

The top of the solid electrode holder 151 has a plug 161 mounted therein which is normally urged to its upward position illustrated by the dotted lines 162 by means of a spring 163. The top of the plug 161 is insulated from its shank by any suitable insulation 159. The bottom of the plug 161 is formed into an annular shouldered cup 164, the upper shoulders of which limit the upward movement of the plug 161 by acting against the annular radially disposed shoulder 165 just below the top of the solid electrode holder 151.

A pair of brackets 166 preferably integral with the combined tubular electrode and hexagonal housing 150 located directly above the hand grip 153 and in spaced relation to each other provide an anchorage for hingedly mounting the operating lever 154 by means of the hinge pin 167. The operating lever 154 extends through apertures 168 and 169 in the upper portion of the hexagonal housing to a position on the opposite side of the welding machine from the hand grip 153 which will admit of ease in manual operation thereof. The spring 157 in urging the solid electrode holder 151 to its normal upward position as hereinbefore described causes the top of the plug 161 mounted in the top of the solid electrode holder 151 to act against the arcuate portion 170 of the operating lever 154 and maintain it in its normal position indicated by the dotted lines 171 against the hexagonal housing at the top of the aperture 169 therein.

One secondary lead 172 of a suitable transformer 173 is connected to a tongue 174 suitably wedged or otherwise secured in the solid electrode holder 151, the said tongue protruding through a slotted aperture 175 in the combined tubular electrode and hexagonal housing 150 in spaced relation thereto. The other secondary lead 176 is connected to a tongue 177 suitably secured to the outside of the combined tubular electrode and hexagonal housing 150. The connection of the secondary leads 172 and 176 of the transformer 173 to the solid electrode holder and the hexagonal housing respectively is best shown in Figs. 3 and 5 of the drawings.

In operating the embodiment of this invention shown in Figs. 3, 4 and 5, the portable welding machine is centered against the work W with its solid electrode holder 151 in its normal position telescoped upwardly within the tubular electrode and hexagonal housing 150 and with the operating lever 154 urged to its upward position indicated by the dotted lines 171. The work W may be backed up by a support or the like when the nature of the work is such that it will not resist the pressure to be applied thereto during welding without harmful distortion or deflection.

When properly located against the work W, manual pressure is applied equally to the hand grip 153 and the operating lever 154 toward the work W which maintains the tubular electrode 150 against the said work W and at the same time compresses the spring 157 which permits the solid electrode holder 151 to move in telescopic relation to the tubular electrode 150 and bring the centrally disposed electrode 152 in contact with the work W.

Additional manual pressure applied to the hand grip 153 and the operating lever 154 toward the work W then causes the spring 163 in the top of the solid electrode holder 151 to compress thereby permitting the plug 161 to move downward until sufficient welding pressure has been applied to the work W by both electrodes 150 and 152, at which time the operating lever 154 has reached the downward position shown in Fig. 4 causing the link 178 connected to the operating lever 154 to close the circuit in the contactor 179 mounted in a suitable housing on top of the combined tubular electrode and hexagonal housing 150. The circuit closed by the contactor 179 actuates a relay 180 which causes a flow of alternating current through the primary winding of the transformer 173 from a source of alternating current supply designated by the numerals 181 and 182 in Fig. 4. The relay 180 is preferably of the adjustable time limit type having an automatic re-set and may be used to regulate the welding time in accordance with the thickness of the work W.

By referring to Fig. 4, the dotted lines 183 represent the flow of welding current through the work W during welding. It will be noted that the welding current is highly intensified at central or spot electrode 152 because of the fact that the area of the tubular or annular electrode 150 in contact with the work W is many times greater than the area of the central electrode 152 in contact with the work W. Inasmuch as the contact surface of the electrode 150 is annular and all portions thereof are uniformly and radially equidistant from the contact surface of the central electrode 152 and because of the aforementioned difference in area between the contact surfaces of the said electrodes, a substantially perfect resistance type spot weld 184 is accomplished concentric with the central electrode 152. The flow of current through work W in the embodiments shown in Fig. 1 and Fig. 2 and the welds accomplished thereby are substantially the same as the flow of current through the work W and the weld accomplished by the embodiment shown in Figs. 3, 4 and 5 herein described. Although it is highly desirable, it is not necessary to have one electrode circumscribed by the other since elliptical, square, triangular or rectangular electrodes may be used providing one electrode is maintained substantially central or symmetrical to the other and the relative areas of the electrodes are such as will provide highly intensified welding current at one electrode. It is essential that one electrode be of the spot type as indicated by the central electrode of Figs. 1, 2 and 4.

Any known means for cooling the electrodes of the welding machines herein disclosed is contemplated as may be required, the said cooling means has not been shown or described inasmuch as a number of cooling systems already known may be readily applied to welding machines embodying this invention by anyone skilled in the art.

Although but several specific embodiments of this invention have been shown and described herein, it will be understood that various changes including size, shape, arrangement and detail of parts may be made without departing from the spirit of my invention and it is not my intention to limit its scope other than by the terms of the appended claims.

I claim:

1. A resistance type electric welding machine comprising a transformer in the upper part of the base thereof, an operating head cantilevered forward from the top of the said transformer, a vertically disposed electrode carrier slidably mounted in the said operating head but insulated therefrom, a tubular electrode telescopingly mounted within said electrode carrier but insulated therefrom, a solid electrode holder telescopingly mounted within said tubular electrode but insulated therefrom, the top of said solid electrode holder uninsulated from and normally in spaced relation to the aforementioned electrode carrier, an electrode mounted in said electrode holder and depending therefrom, means for positioning said electrodes in welding relationship to one side of work to be welded thereby, said electrode carrier and tubular electrode being connected to the transformer secondary, and means for causing welding current to flow through said electrodes and work.

2. In an electric resistance welding machine, a transformer having a secondary winding which forms a housing therefor, a tubular electrode slidably mounted through one end of said transformer housing but insulated therefrom, a solid electrode holder telescopingly mounted through said tubular electrode and slidably mounted through the other end of said transformer housing but insulated from both the tubular electrode and the transformer housing, an electrode mounted in said solid electrode holder and depending therefrom, said tubular electrode and solid electrode holder each electrically connected to a secondary transformer terminal, means for positioning said electrodes in welding relationship to one side of work to be welded thereby, and means for causing welding current to flow through said electrodes and work.

3. In an electric resistance welding machine, a transformer having a secondary winding which forms a housing therefor, a tubular electrode, a solid electrode holder telescopingly mounted through said tubular electrode but insulated therefrom, an electrode mounted in said solid electrode holder and depending therefrom, both the said tubular electrode and said solid electrode holder being slidably mounted through the transformer housing but insulated therefrom, the tubular electrode connected to one transformer terminal, the solid electrode holder connected to the other transformer terminal, the said electrodes adapted to be urged into welding pressure against one side of work to be welded thereby, and means for causing welding current to flow through said electrodes and work.

4. An electric resistance welding machine comprising a transformer having a secondary winding which forms a housing therefor, a tubular electrode, a solid electrode holder telescopingly mounted in said tubular electrode but insulated therefrom, said tubular electrode and solid electrode holder slidably mounted through said transformer secondary but insulated therefrom, said tubular electrode connected to one secondary transformer terminal, said solid electrode holder connected to the other secondary transformer terminal, an electrode mounted in said solid electrode holder having an area of contact with work to be welded infinitely less than the area of contact of said tubular electrode, means for positioning said tubular electrode against one side of work to be welded together, means for moving the other electrode into contact with said work and means for causing a flow of welding current through said work after sufficient welding pressure has been applied thereto.

5. In an electric resistance welding machine, in combination, a spot type central electrode, a tubular electrode having an area of contact infinitely greater than that of said spot type central electrode, said central electrode telescopingly mounted in insulated relation concentric to and within the tubular electrode, means for first bringing and maintaining said tubular electrode in contact with one face of work to be welded together under a desired welding pressure, means for then bringing and maintaining said spot type electrode in contact with the same face of work to be welded together under a desired welding pressure, and automatic means responsive to said last mentioned pressure means for causing a flow of welding current through said electrodes and work when sufficient welding pressure has been applied thereto.

PETER W. FASSLER.